United States Patent [19]

Wertz

[11] Patent Number: 4,681,448

[45] Date of Patent: Jul. 21, 1987

[54] METHOD AND APPARATUS FOR STABILIZING ANGLE OF ACCEPTANCE OF MULTIPLE-BEAM INTERFEROMETER MEANS IN OPTICAL MEASURING SYSTEM

[75] Inventor: Ronald D. Wertz, Boulder, Colo.

[73] Assignee: Ball Corporation, Muncie, Ind.

[21] Appl. No.: 715,825

[22] Filed: Mar. 25, 1985

[51] Int. Cl.⁴ .............................................. G01B 9/02
[52] U.S. Cl. .................................... 356/352; 356/363
[58] Field of Search ......................... 356/352, 358, 363

[56] References Cited

U.S. PATENT DOCUMENTS

| | | |
|---|---|---|
| 3,765,772 | 10/1973 | Willett .................................. 356/352 |
| 3,970,389 | 7/1976 | Mendrin et al. . |
| 3,977,788 | 8/1976 | Moore . |
| 4,173,442 | 11/1979 | Snyder . |
| 4,406,543 | 9/1983 | Nemiroff et al. ............... 356/352 X |
| 4,444,501 | 4/1984 | Schwiesow . |
| 4,457,625 | 7/1984 | Greenleaf et al. . |

OTHER PUBLICATIONS

Bhattacharyya et al. "A Method for Stabilising an Air-Spaced Fabry-Perot Etalon", *J. Phys. E*, vol. 10, No. 9, pp. 878-879, 9/77.

*Primary Examiner*—Davis L. Willis
*Assistant Examiner*—Matthew W. Koren
*Attorney, Agent, or Firm*—Sheridan, Ross & McIntosh

[57] ABSTRACT

A method and apparatus is disclosed for stabilizing the operative angle of acceptance of a multiple-beam interferometer means that is employed in an optical measuring system wherein optical radiation source means are employed. In accordance with the disclosed apparatus, the optical radiation source means is utilized to provide a reference point optical radiation source which emits reference optical radiation that is received by the multiple-beam interferometer means. With respect to such reference optical radiation, a set of reference non-localized multiple-beam interference fringes are created by the interferometer means. A photoelectric detection means is provided to detect the two-dimensional position of at least a portion of the innermost interference fringe of the reference set of interference fringes. Such positional information is transmitted by electrical signals to a processor means which compares such signals to desired values therefor. The desired values reflect what size said detected innermost fringe should be if the multiple-beam interferometer means is operating at a predetermined and desired angle of acceptance. If deviations from such desired values are discerned by the processor means, the processor means will transmit a control signal to the optical radiation source means. The control signal will instruct the optical radiation source means to vary the wavelength of the radiation emitted thereby so as to cause the operative angle of acceptance of the interferometer means to stabilize about the desired value therefor.

13 Claims, 2 Drawing Figures

METHOD AND APPARATUS FOR STABILIZING ANGLE OF ACCEPTANCE OF MULTIPLE-BEAM INTERFEROMETER MEANS IN OPTICAL MEASURING SYSTEM

FIELD OF THE INVENTION

The present invention is directed to optical measuring assemblies, and more particularly to a method and apparatus for stabilizing the operative angle of acceptance of optical radiation of a multiple-beam interferometer means employed in an optical measuring assembly.

BACKGROUND OF THE INVENTION

Interferometers can be employed in optical systems which, by way of example, are capable of measuring spectral characteristics of light sources or one or more of the positional coordinates of distant points relative to a known frame of reference. With respect to such systems, temperature changes and mechanical vibrations in the operative environment can cause undersirable variations in the spacing between the two optical plates which comprise the interferometer. As a result, the accuracy of the measurements made by such optical systems is adversely affected.

To date, several different techniques have been devised to monitor and correct the aforementioned problem. All of such techniques entail the use of some type of servo system which mechanically adjusts the position of the optical plates which comprise the interferometer in response to a detected, undesirable variation in the spacing therebetween. As can be readily appreciated, such servo systems typically comprise an arrangement of a plurality of components which require a high degree of calibration, and which are inevitably susceptible to mechanical failure.

In one type of optical measuring system, modulatory means can be employed to provide a point optical radiation source at one or more distant points whose positional coordinates are to be determined. In addition, such a system can employ a multiple-beam interferometer means (e.g. Fabry-Perot interferometer) as an angular filter so as to limit the direct transmission of incident optical radiation emitted from each aforementioned point optical radiation source to those radiation beams which encounter the front optical plate of the interferometer means at substantially a particular angle of incidence, referred to as the operative angle of acceptance. With respect to this type of a system, it may be preferable to maintain, or stabilize, the operative angle of acceptance of the interferometer at a relatively constant and predetermined value in order for accurate measurements to be obtained. A system of this nature is described in a co-pending application assigned Ser. No. 646,638 now U.S. Pat. No. 4,627,722.

Where the maintenance of a relatively constant and known value for the operative angle of acceptance of a multiple-beam interferometer means in the aforementioned type of optical system is desired, environmental temperature changes and vibrations can create significant problems since such temperature changes and vibrations can, as noted above, cause undesirable variations in the spacing between the two optical plates of the interferometer means. Such temperature variations can also cause a variation in the refractive index of the optical plates. Both of the aforementioned types of variations can cause the operative angle of acceptance of the interferometer means to deviate from the desired value therefor. Although a mechanical servo system could perhaps be applied to stabilize the operative angle of acceptance by controlling the spacing between the optical plates of the interferometer means, the aforementioned drawbacks discourage the application of the same. In addition, the application of known mechanical servo systems cannot presently account for the effect of temperature variations upon the refractive index of optical plates comprising an interferometer.

DISCLOSURE OF INVENTION

It is therefore one object of the present invention to provide an apparatus for stabilizing the operative angle of acceptance of a multiple-beam interferometer means that is employed in an optical measuring system as described hereinbelow, which apparatus does not entail the inclusion of means for mechanically adjusting the position of the optical plates comprising the interferometer means.

An additional object of the disclosed invention is to provide a method and apparatus for stabilizing said angle of acceptance which do not entail the use of any mechanical means.

It is another objective of the invention to provide a method and apparatus for stabilizing said angle of acceptance in response to an undesired variation in the spacing between the optical plates comprising said interferometer means.

It is yet another objective of the present invention to provide a method and apparatus for stabilizing said angle of acceptance in response to an undesired variation of the refractive index of one or both of the optical plates comprising said interferometer means.

Additional objects, advantages and novel features are set forth in the description which follows, and will be become apparent to those skilled in the art upon examination hereof, or upon actual practice of the disclosed invention.

In accordance with the present invention, a method and apparatus is provided for stabilizing the operative angle of acceptance of a multiple-beam interferometer means (e.g. Fabry-Perot interferometer) that is employed in an optical measuring system wherein the primary portion (in terms of intensity) of the optical radiation received and transmitted by the interferometer means is of substantially a single known wavelength and is initially emitted by a controllable, modulatory optical radiation source means capable of providing a point light source at one or more distant points. It should be noted that the subject invention is particularly adapted for use with the assembly disclosed in the aforementioned co-pending patent application assigned Ser. No. 646,638.

The apparatus comprises a reference target means on which a reference point optical radiation source is provided in a known manner by the aforementioned optical radiation source means. The reference target means is positioned a known distance from the interferometer means, and is further positioned so that at least a reference portion of the optical radiation emitted by the reference point optical radiation source is directed towards the front optical plate of the interferometer means.

Upon encountering the interferometer, a portion of the reference optical radiation will pass through the front optical plate and encounter the back optical plate of the interferometer means. The interferometer is designed in a known manner so that a portion of reference optical radiation which passes through the front optical plate will constructively interfere within the interferometer means on one of several optical paths which pass through the back optical plate of the interferometer means. Constructive interference on such optical paths results in the creation of a set of reference non-localized multiple-beam interference fringes, (known as Tolansky fringes), which are visible on the back optical plate of the interferometer means.

With respect to the innermost fringe of the set of reference interference fringes, the brightest portion thereof is created in part by reference optical radiation which encounters the front optical plate of the interferometer means at substantially the operative angle of acceptance of the interferometer means, and is therefore transmitted substantially directly through the front and back optical plates of the interferometer means. In view of the foregoing, it should be appreciated that the size, or diameter, of the aforementioned innermost reference interference fringe is directly related to and dependent upon the operative angle of acceptance of the interferometer means.

It should also be pointed out that it is known that the operative angle of acceptance of a multiple-beam interferometer means is, with respect to the optical radiation received from a particular radiation source, in part dependent upon the wavelength of such optical radiation. In addition, and as noted hereinabove, such angle of acceptance is also dependent upon the spacing between and refractive index of the optical plates of the interferometer means. The present invention recognizes the above-described relationships, and provides a method and apparatus for use in an optical measuring system wherein undesired variations in the spacing between and refractive index of optical plates comprising a multiple-beam interferometer means are monitored and offset by the controlled variation of the wavelength of the provided optical radiation, so that the operative angle of acceptance with respect to such provided optical radiation is stabilized substantially about a desired value therefor.

To accomplish the foregoing, a photoelectric detection means is provided behind the back optical plate of the interferometer means and is designed to detect the two-dimensional position of at least the innermost fringe of the aforementioned set of reference interference fringes relative to a reference optical center axis. The photoelectric detection means is further designed to transmit such detected two-dimensional information to a processor means by electric signals.

The processor means, in turn, receives said electric signals and compares them to desired values therefor. Such desired values reflect what size, or diameter, the aforementioned innermost reference interference fringe should be if the interferometer means is operating at the desired angle of acceptance with respect to the reference optical radiation received by the interferometer means. In the event that a deviation from such desired values is detected by the processor means, the processor means is designed so that it electrically transmits a control signal to the optical radiation source means. Such control signal instructs the optical radiation source means to either increase or decrease, in a specified amount, the wavelength of the optical radiation emitted by the point light sources provided by such means. By continually monitoring the size of the innermost reference interference fringe in the manner aforesaid, the wavelength of said optical radiation provided by the optical radiation source means can be selectively controlled so that the aforementioned desired values are satisfied and the operative angle of acceptance is stabilized about the desired value therefor.

DETAILED DESCRIPTION OF THE PREFERRED EMBODIMENT

Figure 1:
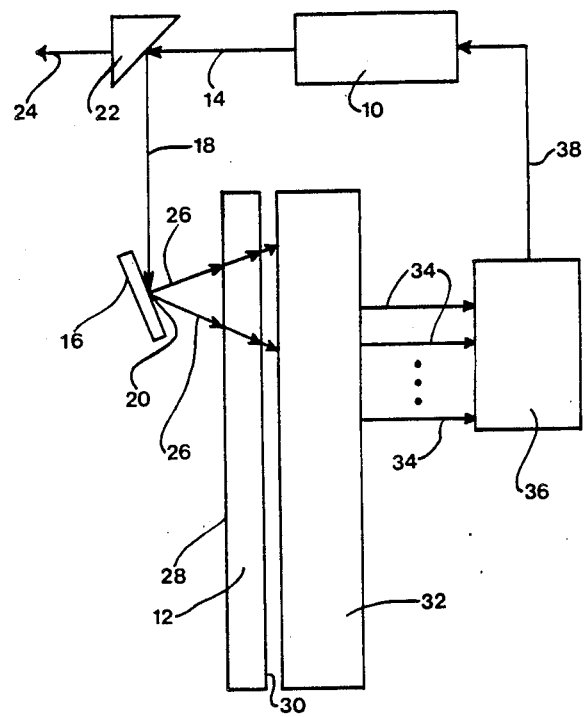
FIG. 1 is a block diagram showing the components of the preferred embodiment of the present invention in combination with an optical measuring system comprising modulatory optical radiation source means and multiple-beam interferometer means.

In accordance with the preferred embodiment of the invention, FIG. 1 shows a block diagram of the inventive apparatus in combination with an optical measuring system that comprises modulatory optical radiation source means 10 and multiple-beam interferometer means 12. The optical radiation source means 10 should be capable of providing a point light source at one or more distant points, and should preferably emit optical radiation 14 that is substantially monochromatic. By way of example, the optical radiation source means 10 may be a laser which emits radiation 14 that is either coherent or incoherent. The multiple-beam interferometer means 12 may, for example, be a Fabry-Perot interferometer.

As represented in FIG. 1, the inventive apparatus includes a reference target means 16 (e.g. a conventional mirror) upon which a first portion 18 of the optical radiation 14 emitted by the optical radiation source means 10 is provided in a known manner to create a reference point optical radiation source 20. By way of example, the optical radiation 14 emitted by optical radiation source means 10 may be split by a beam splitter 22 to provide said first optical radiation portion 18 and a second optical radiation portion 24, which second portion may be employed for measurement purposes in the associated optical measuring system.

The reference target means 16 is positioned a known distance from the Fabry-Perot interferometer 12, and is further positioned so that at least a reference portion 26 of the optical radiation emitted by the reference point optical radiation source 20 is directed towards the front optical plate 28 of the Fabry-Perot interferometer 12. Upon encountering the Fabry-Perot interferometer 12, a portion of the reference optical radiation 26 will pass through the front optical plate 28 and encounter the back optical plate 30 of the Fabry-Perot interferometer 12. The Fabry-Perot interferometer 12 is designed in a known manner so that a portion of the reference optical radiation 26 which passes through the front optical plate 28 will constructively interfere within the interferometer 12 on one of several optical paths which pass through the back optical plate 30 of the interferometer 12. Constructive interference on such optical paths results in the creation of a set of reference non-localized multiple-beam interference fringes which are visible on the back optical plate 30 of the Fabry-Perot interferometer 12.

With respect to the innermost fringe of the set of reference interference fringes, the brightest portion thereof is created in part by reference optical radiation 26 which encounters the front optical plate 28 of the Fabry-Perot interferometer 12 at substantially the operative angle of acceptance of the Fabry-Perot interferometer 12, and is therefore transmitted substantially directly through the front optical plate 28 and back plate 30 of the Fabry-Perot interferometer 12. For purposes of illustration, the reference optical radiation beams 26 shown in FIG. 1 represent optical radiation beams which encounter the front optical plate 28 of the Fabry-Perot interferometer 12 at the operative angle of acceptance of the Fabry-Perot interferometer 12. As pointed out hereinabove, and as illustrated in FIG. 1, it should be appreciated that the size, or diameter, of the aforementioned innermost reference interference fringe is directly related to and dependent upon the operative angle of acceptance of the Fabry-Perot interferometer 12.

It is also important to understand that the operative angle of acceptance of the Fabry-Perot interferometer 12 will be, with respect to the reference optical radiation 26 received from the reference point optical radiation source 20, in part dependent upon the wavelength of such optical radiation. In addition, such operative angle of acceptance will also be dependent upon the spacing between and refractive index of the front optical plate 28 and back optical plate 30 of the Fabry-Perot interferometer 12. As set forth hereinbelow, the disclosed apparatus recognizes the above-described relationships, and provides a means for stabilizing the operative angle of acceptance of the Fabry-Perot interferometer 12 about a desired value therefor in response to variations in the spacing between and refractive index of the front and back optical plates, 28 and 30 respectively, of the Fabry-Perot interferometer 12. Such variations could, for example, be caused by temperature changes in the operative environment and/or mechanical vibrations.

In further accordance with the present invention, a photoelectric detection means 32 (e.g. a charge coupled device or a Vidicon camera) is provided behind the back optical plate 30 of the Fabry-Perot interferometer 12 and is designed to detect the two-dimensional position of at least the innermost fringe of the aforementioned set of reference interference fringes relative to a reference optical center axis. The photoelectric detection means 32 is designed to transmit such detected two-dimensional information to a processor means 36 by electric signals 34.

The processor means 36 receives said electric signals 34 from the photoelectric detection means 32 and compares such signals to desired values therefor. Such desired values reflect what size, or diameter, the aforementioned innermost reference interference fringe should be if the Fabry-Perot interferometer 12 is operating at the predetermined and desired angle of acceptance with respect to the reference optical radiation 26 emitted by the reference point optical radiation source 20 and received by the Fabry-Perot interferometer 12. In the event that a deviation from such desired values is detected by the processor means 36, the apparatus is designed so that the processor means 36 will electrically transmit a control signal 38 to the optical radiation source means 10. Such control signal 38 instructs the optical radiation source means 10 to either increase or decrease, in a specified amount, the wavelength of the optical radiation 14 emitted by it. As such, the wavelength of the reference optical radiation 26 is also controlled. By continually monitoring the size of at least the innermost reference interference fringe in the manner aforesaid, the wavelength of the reference optical radiation 26 can be selectively controlled so that the aforementioned desired values are satisfied and the operative angle of acceptance of the Fabry-Perot interferometer 12 is stabilized about the desired value therefor.

In view of the foregoing, it should be appreciated that the disclosed apparatus can respond to variations in the refractive index of and spacing between the front optical plate 28 and back optical plate 30 of a Fabry-Perot interferometer 12 employed in an optical measuring system, so that the operative angle of acceptance of the Fabry-Perot interferometer 12 can be stabilized and maintained about a desired value therefor. In addition, it should be noted that the disclosed apparatus also provides a means by which an optical radiation source means 10 employed in an optical measuring system can be monitored and controlled so that any drift in the wavelength of the optical radiation 14 emitted thereby can be quickly corrected. That is, if in the operation of an optical measuring system the optical radiation 14 emitted by the optical radiation source means 10 begins to drift, the operative angle of acceptance of the Fabry-Perot interferometer 12 will also vary so as to cause a change in the diameter, or size, of the innermost fringe of the aforementioned reference set of interference fringes. Such a variation will be detected by the photoelectric detection means 32 and processor means 36, and the processor means 36 will, in turn, electrically transmit a control signal 38 to the optical radiation source means 10 to correct the wavelength drift.

Figure 2:
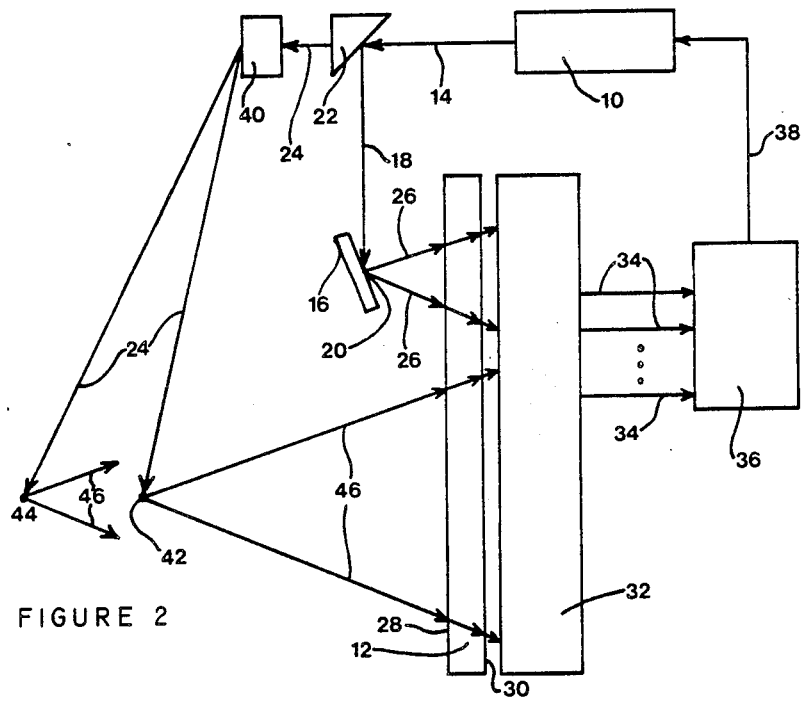
FIG. 2 is a block diagram showing the components of the preferred embodiment of the present invention in combination with an optical measuring system disclosed in a co-pending patent application assigned Ser. No. 646,638.

FIG. 2 illustrates the above-described apparatus in combination with an optical measuring system that is disclosed in a co-pending application assigned Ser. No. 646,638. The optical measuring system disclosed in such application is designed to determine the three-dimensional coordinates of one or more distant points relative to a predetermined frame of reference. In order to make such determinations, the referenced optical measurement system requires the establishment of a point light source at each distant point. As shown in FIG. 2, the aforementioned second optical radiation portion 24 of the present invention can be utilized in connection with the referenced optical measuring system to provide a point light source (e.g. 42 and 44) at one or more distant points, the three-dimensional coordinates of which are to be determined. By way of example, the second optical radiation portion 24 can be directed to such distant points through the utilization of beam deflector means 40. In accordance with the referenced measuring system, the optical radiation 46 emitted from each distant point light source 42 and 44 is received by the Fabry-Perot interferometer 12. In turn, photoelectric detection means and processor means are employed in the referenced system to determine the three-dimensional coordinates of each distant point.

Of particular importance, it should be noted that the photoelectric detection means 32 employed in the apparatus disclosed hereinabove can also serve as the photoelectric detection means utilized in connection with the assembly disclosed in said co-pending application. In addition, the processor means 36 utilized in connection with the apparatus disclosed herein can serve as the processor means employed as a part of the assembly disclosed in said co-pending patent application. By employing the disclosed apparatus in connection with the assembly disclosed in said co-pending application, the operative angle of acceptance of the Fabry-Perot interferometer 12 utilized in such assembly can be stabilized about a desired value therefor, so that the three-dimensional measurements made by such optical system can maintain a high degree of accuracy.

Based upon the foregoing, salient features of the present invention can easily be discerned. The disclosed apparatus provides a reference point optical radiation source which emits reference optical radiation that is received by a multiple-beam interferometer means. With respect to the reference optical radiation received by the interferometer means, a set of non-localized multiple-beam interference fringes are created. A photoelectric detection means is positioned behind the back plate of the multiple-beam interferometer means and detects the two-dimensional position of at least a portion of the innermost interference fringe created with respect to the reference optical radiation received by the interferometer means from the reference point optical radiation source. Such positional information is transmitted by electric signals to a processor means which compares such signals to desired values therefor. Such desired values reflect what size the innermost fringe of the aforementioned set of interference fringes should be if the multiple-beam interferometer means is operating at a predetermined and desired angle of acceptance. If deviations from the aforementioned desired values are discerned by the processor means, the processor means will transmit a control signal to an optical radiation source which provides the optical radiation to the reference point optical radiation source. The control signal will instruct the optical radiation source to vary the wavelength of the emitted radiation so as to cause the operative angle of acceptance of the interferometer means to stabilize about the desired value therefor.

What is claimed is:

1. In an optical measuring assembly which includes optical radiation emitting means for providing radiation of a first wavelength and a multiple-beam interferometer means, an apparatus for stabilizing the operative angle of acceptance of the interferometer means about a desired value therefor, comprising:
 a means for detecting deviations of said operative angle of acceptance from said desired value therefor, said detecting means including said multiple-beam interferometer means which substantially limits transmission of radiation emitted from said emitting means to that radiation encountering said multiple-beam interferometer means at substantially a particular angle of incidence; and
 a means, operatively associated with said detecting means, for varying the wavelength of optical radiation emitted by said emitting means from said first wavelength to a second wavelength, said second wavelength having a value such that said operative angle of acceptance is stabilized about said desired value therefor.

2. An apparatus, as recited in claim 1, wherein said detecting means comprises the following:
 a reference target means on which a reference point optical radiation source is provided by said optical radiation emitting means;
 a photoelectric detection means which detects at least a portion of the innermost interference fringe created by said multiple-beam interferometer means with respect to radiation received by the interferometer means from said reference point optical radiation source, and which transmits first electric signals in response to said detected interference fringe; and
 a processor means which receives said first electric signals and generates a second electric signal when said first electric signals indicate that said operative angle of acceptance is different from said desired value therefor.

3. An apparatus, as recited in claim 2, wherein said controlling means is responsive to said second electric signal and communicates with said optical radiation emitting means so as to vary the wavelength of the optical radiation emitted by said reference point optical radiation source so that said operative angle of acceptance is stabilized about said desired value therefor.

4. An apparatus, as recited in claim 2, wherein said processor means and controlling means are embodied in a common unit.

5. An apparatus, as recited in claim 2, wherein said reference target means is a mirror.

6. An apparatus, as recited in claim 2, wherein said innermost interference fringe is a non-localized multiple-beam interference fringe.

7. An apparatus, as recited in claim 2, wherein said photoelectric detection means is a charge coupled device.

8. An apparatus, as recited in claim 2, wherein said photoelectric detection means is a Vidicon camera.

9. An apparatus, as recited in claim 1, wherein said multiple-beam interferometer means is a Fabry-Perot interferometer.

10. An apparatus, as recited in claim 1, wherein said optical radiation emitting means emits optical radiation that is substantially monochromatic.

11. In an optical measuring process which includes the steps of providing optical radiation of a first wavelength and employing a multiple-beam interferometer means, a method for stabilizing the operative angle of acceptance of the interferometer means about a desired value therefor, comprising the following steps:
 detecting a quantity related to the mangitude of deviations of said operative angle of acceptance from said desired value therefore using said multiple-beam interferometer means which limits transmission of radiation emitted from said emitting means to that radiation encountering said multiple beam interferometer means at substantially a particular angle of incidence;
 varying the wavelength of said provided optical radiation in response to detected deviations of said operative angle of acceptance from said desired value therefore, from said first wavelength to a second wavelength, said second wavelength having a value such that said operative angle of acceptance is stabilized about said desired value therefor.

12. A method, as recited in claim 11, wherein said detecting step comprises the following steps:
 splitting said provided optical radiation to obtain reference optical radiation;
 detecting at least a portion of the innermost interference fringe created by said multiple-beam interferometer means with respect to reference optical radiation received by the interferometer means;
 generating a control signal when said detected interference fringe indicates that said operative angle of acceptance is different from said desired value therefor.

13. A method, as recited in claim 12, wherein said varying step comprises the step of utilizing said control signal.

* * * * *